United States Patent
Shorrock et al.

(10) Patent No.: US 11,274,776 B2
(45) Date of Patent: Mar. 15, 2022

(54) CONNECTOR DEVICE

(71) Applicant: KUTTING UK LIMITED, Bedfordshire (GB)

(72) Inventors: Lee Peter Shorrock, Northampton (GB); Kevin Johnson, Northampton (GB); Peter Shorrock, Northampton (GB)

(73) Assignee: KUTTING UK LIMITED, Bedfordshire (GB)

(*) Notice: Subject to any disclaimer, the term of this patent is extended or adjusted under 35 U.S.C. 154(b) by 114 days.

(21) Appl. No.: 16/336,245

(22) PCT Filed: Sep. 8, 2017

(86) PCT No.: PCT/EP2017/025253
§ 371 (c)(1),
(2) Date: Mar. 25, 2019

(87) PCT Pub. No.: WO2018/086751
PCT Pub. Date: May 17, 2018

(65) Prior Publication Data
US 2019/0277430 A1  Sep. 12, 2019

(30) Foreign Application Priority Data
Nov. 14, 2016  (GB) ..................................... 1619282

(51) Int. Cl.
*F16L 19/00* (2006.01)
*F16L 19/06* (2006.01)
*F16L 19/065* (2006.01)

(52) U.S. Cl.
CPC .......... *F16L 19/005* (2013.01); *F16L 19/061* (2013.01); *F16L 19/0653* (2013.01)

(58) Field of Classification Search
CPC ... F16L 19/005; F16L 19/061; F16L 19/0653; F16L 19/065; F16L 19/08; Y10T 403/7056

(Continued)

(56) References Cited

U.S. PATENT DOCUMENTS

| 3,083,041 A | 3/1963 | Owenmark |
| 3,733,093 A * | 5/1973 | Seiler ...................... F16L 19/08 |
| | | 285/382.7 |

(Continued)

FOREIGN PATENT DOCUMENTS

| EP | 2921756 A1 * | 9/2015 | ............ F16L 19/061 |
| WO | 99/32821 | 7/1999 | |
| WO | 2016/016597 | 2/2016 | |

*Primary Examiner* — Zachary T Dragicevich
(74) *Attorney, Agent, or Firm* — Clark & Brody LP

(57) ABSTRACT

A connector device has male and female parts with respective coaxial passageways. An external screwthread of a collet engages an internal screwthread on the female part and relative rotation between those screwthreads causes engagement of the female and male parts. A slot in the collet extends longitudinally and is open at both ends to enable the collet to be splayed as a split collet. A wedge located between the male part and the collet is displaceable longitudinally to splay the collet and lock the male and female parts in a sealing engagement. The connector includes a ring surrounding the end of the collet remote from the engagement between the male and female parts to resist splaying of the collet at that end. The connector without the male and female parts may also be used for connecting other such male and female parts.

14 Claims, 4 Drawing Sheets

(58) Field of Classification Search
USPC .................................................. 285/382.7
See application file for complete search history.

(56) References Cited

U.S. PATENT DOCUMENTS

| | | | | |
|---|---|---|---|---|
| 4,062,572 A | * | 12/1977 | Davis | ................... F16L 47/005 |
| | | | | 285/382.7 |
| 4,138,145 A | * | 2/1979 | Lawrence | ............... F16L 19/08 |
| 5,695,297 A | * | 12/1997 | Geib | |
| 6,488,318 B1 | * | 12/2002 | Shim | ................... F16L 19/061 |
| | | | | 285/382.7 |

* cited by examiner

CONNECTOR DEVICE

SUMMARY OF THE INVENTION

The present invention relates to a connector device comprising:
  a male part;
  a female part which engages the male part when those two parts are connected together, those two parts having respective passageways which are coaxial when those two parts are connected together;
  a collet which surrounds the male part and is coupled thereto, which collet has an external screwthread which engages an internal screwthread on the female part, so that relative rotation between those screwthreads in a given sense causes the female part to sealingly engage the male part, and which collet has at least one slot in it which extends longitudinally with respect to the axis of the screwthreads to enable the collet to be splayed, and which slot is open at both ends so that the collet is a split collet; and
  a wedge part which is located between the male part and the collet and is displaceable longitudinally with respect to the axis of the screwthreads to splay the collet thereby to lock the male and female parts in such a sealing engagement with one another.

A connection device having such a construction is described and illustrated in WO2016/016597. One problem with the device disclosed therein is that the collet may splay at the end further from the position where the male and female parts sealingly engage one another, and although this does not render the locking effect of splaying of the collet ineffective, it does have a somewhat deleterious effect thereon. On the other hand, collets described in that earlier specification which have a slot which terminates before it reaches the rear end of the collet tend to be too stiff for an especially good locking action.

The present invention seeks to provide a remedy.

Accordingly, the present invention is directed to a connector device having the construction set out in the opening sentence of the present specification, characterised in that
  the connector device further comprises a closed ring which surrounds that end of the collet which is further from the position at which the male and female parts sealingly engage one another, thereby to resist splaying of the collet at that end.

The collet may have a generally cylindrical rear end with an outer surface havin an annular groove in it which receives the said closed ring.

An interior leading edge of the closed ring may be chamfered to assist its placement on the collet into the groove.

The closed ring may have been heated to expand it and facilitate such placement into the groove.

The closed ring may be provided with an internal screwthread and the collet may be provided with a corresponding external screwthread at its rear end to enable the closed ring to be screwed onto the rear end of the collet.

The said sealing engagement may be between a chamfered rim at an end of the male part, and a chamfered lip within the female part.

This facilitates a good seal.

The angle of the chamfering on the male part, relative to the axis of the screwthreads, may be less than the angle of the chamfering on the female part.

This enables the material at the end of the male part to displace the material of the female part, and effect a strong seal.

The included angle of the chamfering on the male and female parts may be in the range from 55° to 65°.

This is especially effective in creating a good seal.

The included angle of the chamfering on the male part end may be substantially 59° and the angle of the chamfering on the female part may be substantially 60°.

The collet may be coupled to the male part by way of a collar around the male part adjacent to said sealing engagement, an end of the collet abutting the collar during relative rotation between the said screwthreads.

This provides an effective transmission of an axial force from the collet to the male part.

The collar may be secured to the male part by way of interengaging screwthreads on the collar and on the male part.

This effects a strong connection between the collar and the male part.

The interengaging screwthreads on the collar and on the male part may be of opposite handedness to the said external screwthread of the collet and the said internal screwthread of the female part.

This ensures that any friction between the collet and the collar does not undo the collar whilst the collet is screwed into the female part.

The surfaces of the collet and the collar which abut one another may be on a slant, such that the collar tapers in a direction towards the collet.

This also tends to splay the collet as the latter is screwed into the female part.

This is achieved most readily if the angle of the slant relative to the axis of the screwthreads is in the range from 55° to 65°, preferably 60°.

The collet may be provided with a nut portion to facilitate relative rotation between the collet and the female part.

The connector device may further comprise a screw having an external screwthread which engages an internal screwthread of the collet, the screw being provided with a portion which engages the wedge part so that relative rotation between the screw and the collet causes the wedge part to be driven further into the region between the collet and the male part, to splay the collet.

This action may be enhanced by having both the wedge part and the region between the collet and the male part tapering in a direction towards the female part.

The angle of slant of the tapering relative to the axis of the screwthreads may be in the range from 25° to 50°, preferably about 35°.

The wedge part may also have at least one slot in it extending longitudinally relative to the axis of the screwthreads.

This provides the advantage that as the screw is tightened, the wedge part is squeezed onto the male part at the same time as the collet is splayed against the internal screwthread of the female part, increasing the locking together of these parts.

The screw and the said wedge part may be abut one another at respective surfaces which are slanted at substantially 45° to the axis of the said screw.

The present invention extends to a connector device comprising a collet and a wedge part as set out in the preceding paragraphs relating to the present invention but without the male and female parts, the device then being suitable for connecting together such male and female parts.

BRIEF DESCRIPTION OF THE DRAWINGS

An example of a connector device embodying the present invention will now be described in greater detail with reference to the accompanying drawings, in which.

DETAILED DESCRIPTION OF THE INVENTION

Figure 1:
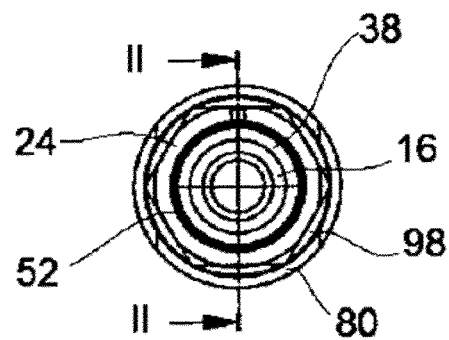
FIG. 1 shows an end view of parts of a connector device embodying the present invention, without a female part thereof.
Figure 2:
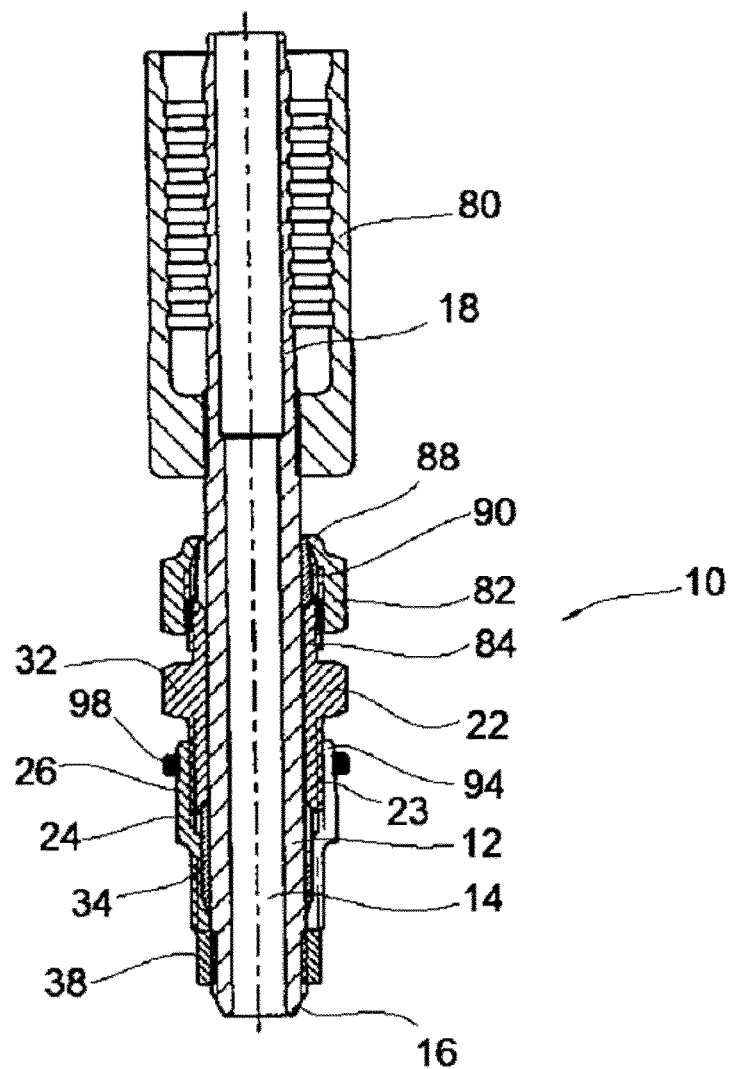
FIG. 2 shows an axial sectional view of the parts shown in FIG. 1, in the plane indicated by the line II-II shown in FIG. 1.
Figure 3:
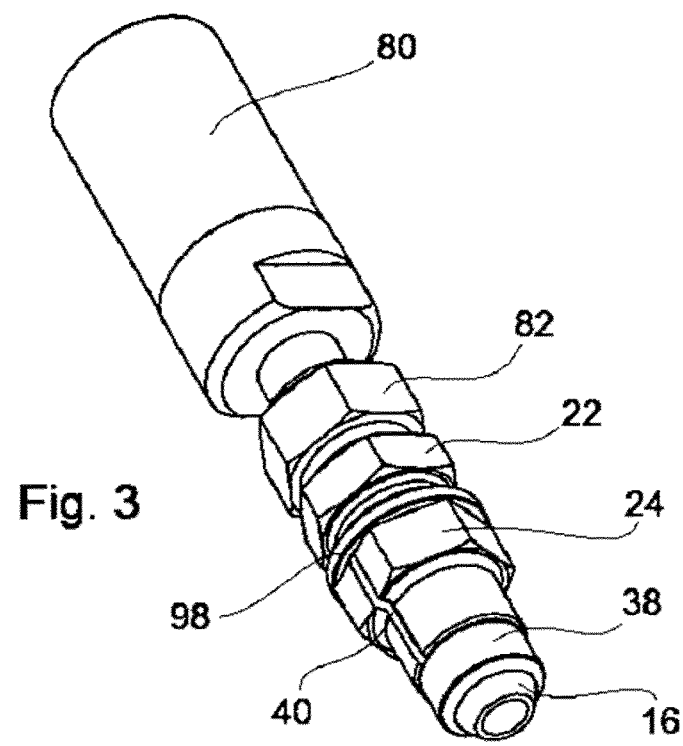
FIG. 3 shows a perspective view from one side and from one end of the device shown in FIGS. 1 and 2.

A connector device 10 shown in FIGS. 1 to 5 comprises a stainless steel tubular male part 12 having an axially extending through-bore 14. The forward end of the male part 12 has a chamfered outer rim 16, the slanting surface of which is everywhere at substantially 29.5° to the longitudinal axis of the male part 12, so that the included angle of chamfering is substantially 59°.

The through-bore 14 is of slightly increased cross-sectional diameter at a rear portion 18 of the male part 12.

The male part 12 is surrounded by a screw 22 having an externally screwthreaded sleeve portion 23 at its forward end. The male part 12 is also surrounded by a collet 24 at its forward and, the collet having a middle portion 26 in the form of a hexagonal nut with an internal screwthread of greater cross-sectional diameter than the external cross-sectional diameter of the male part 12, the internal screwthread of the collet 24 being screwthreadingly engaged by the external screwthread of the screw 22.

The screw 22 has a rearward portion 32 which is in the form of a hexagonal nut to enable it to be engaged by a spanner (not shown).

The connector device 10 is further provided with a wedge part 34 with a split rearward half and which has forward outer wedge surfaces 36 which are everywhere on a slant relative to the longitudinal axis of the male part 12, and also therefore relative to the axis of the screwthreads of the device 10, at an angle of substantially 35° thereto. The wedge part 34 is generally cylindrical, and is sandwiched between the collet 24 and the male part 12 which it surrounds. The collet 24 is provided with an internal wedge surface 37 which is also on a slant relative to the longitudinal axis of the male part 12 at an angle of substantially 35°, and is in abutment with the wedge surfaces 36 of the wedge part 34.

The rear end of the wedge part 34 is chamfered to provide an outer surface which is everywhere on a slant relative to the longitudinal axis of the male part 12 at an angle of substantially 45° thereto. It abuts a corresponding internal surface of the screw 22 which is also at an angle of 45° to the longitudinal axis of the male part 12.

The connector device 10 shown in FIGS. 1 to 5 is also provided with a reverse threaded collar 38 having an internal left-handed screwthread engaging a left-handed screwthread on the outside of the forward end of the male part 12.

Figure 5:
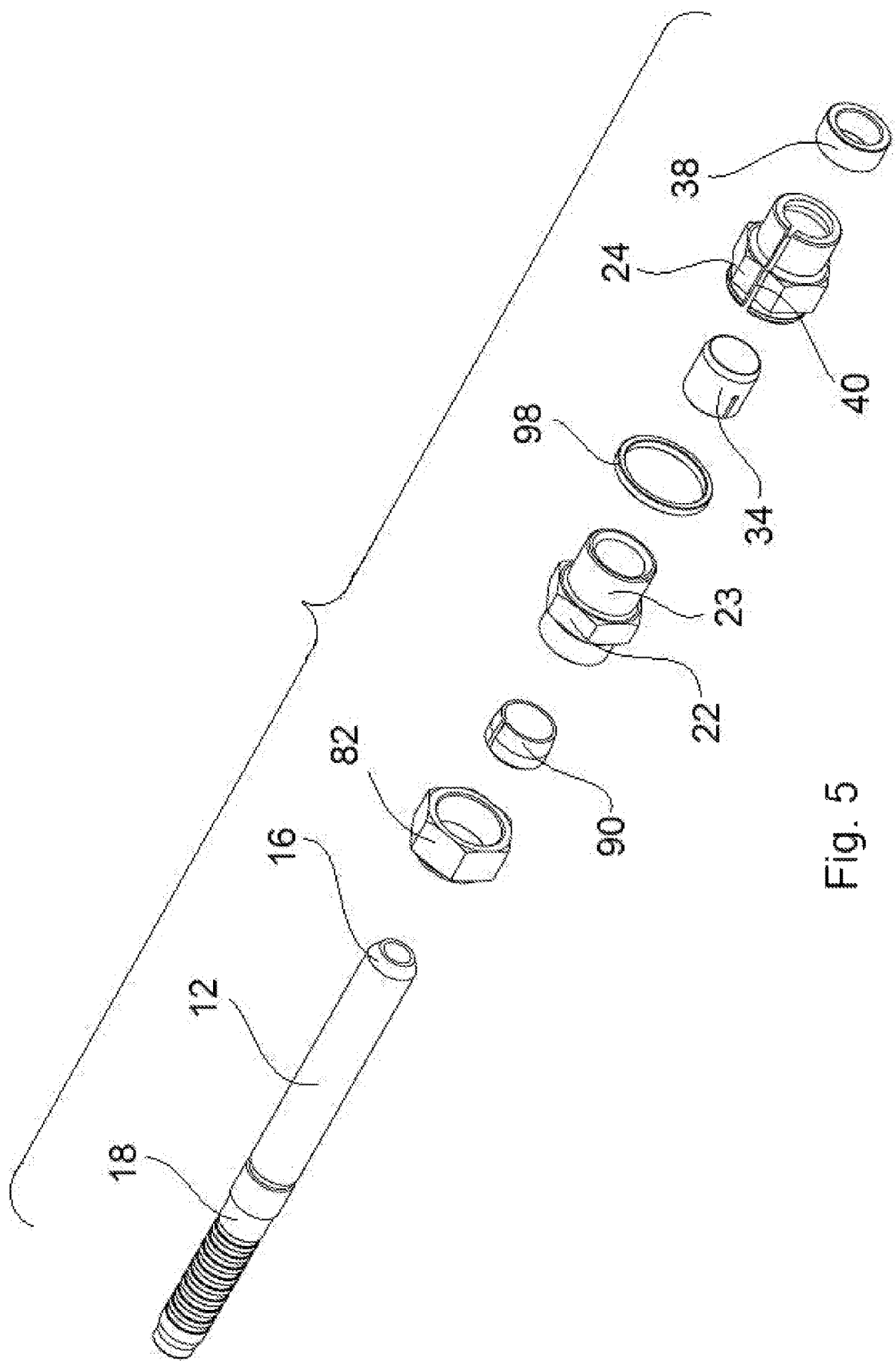
FIG. 5 shows an exploded view of parts shown in FIGS. 1 to 4.

As is more readily seen in FIG. 5, the collet is a split collet in that it has a through-slot 40 extending all the way from and opening onto its front end, to its rear end at which it is also open. The collet 24 has a generally cylindrical rear end 94 with an outer surface having an annular groove 96 in it which receives a closed ring or hoop 98.

The rear portion 18 of the male part 12 is provided on its outside surface with a series of annular ribs, and is surrounded by a hollow cylindrical hose connector ferrule 80 the internal surface of which is also formed with a series of annular ribs whereby a hose end (not shown) can be urged into the hollow of the ferrule 80 and trapped between the ribbed surfaces of the male part 12 and the ferrule 80. The forward end of the ferrule 80 is thicker so that it fits snugly against the exterior surface of the male part 12. The hose end (not shown) is then held in position by swaging of the ferrule 80.

An anti-vibration nut 82 has an internal screwthreading at its forward end which engages an external screwthreading on a rear end 84 of the screw 22. The end 84 has a rearwardly facing end surface 86 which is everywhere at an angle of 45° to the axis of the male part 12, the end surface 86 being concave. The nut 82 has an anti-vibration rearward end 88 that engages a rearward end of a split wedge ferrule 90 accommodated between the nut 82 and the male part 12. The forward end of the split wedge ferrule 90 has a convex surface 92, and is everywhere at an angle of 45° to the male part axis. The rearward end of the split wedge ferrule 90 tapers more sharply than the interior of the rear end of the anti-vibration nut 82. The forward end of the split wedge ferrule 90 abuts the surface 86.

Figure 6:
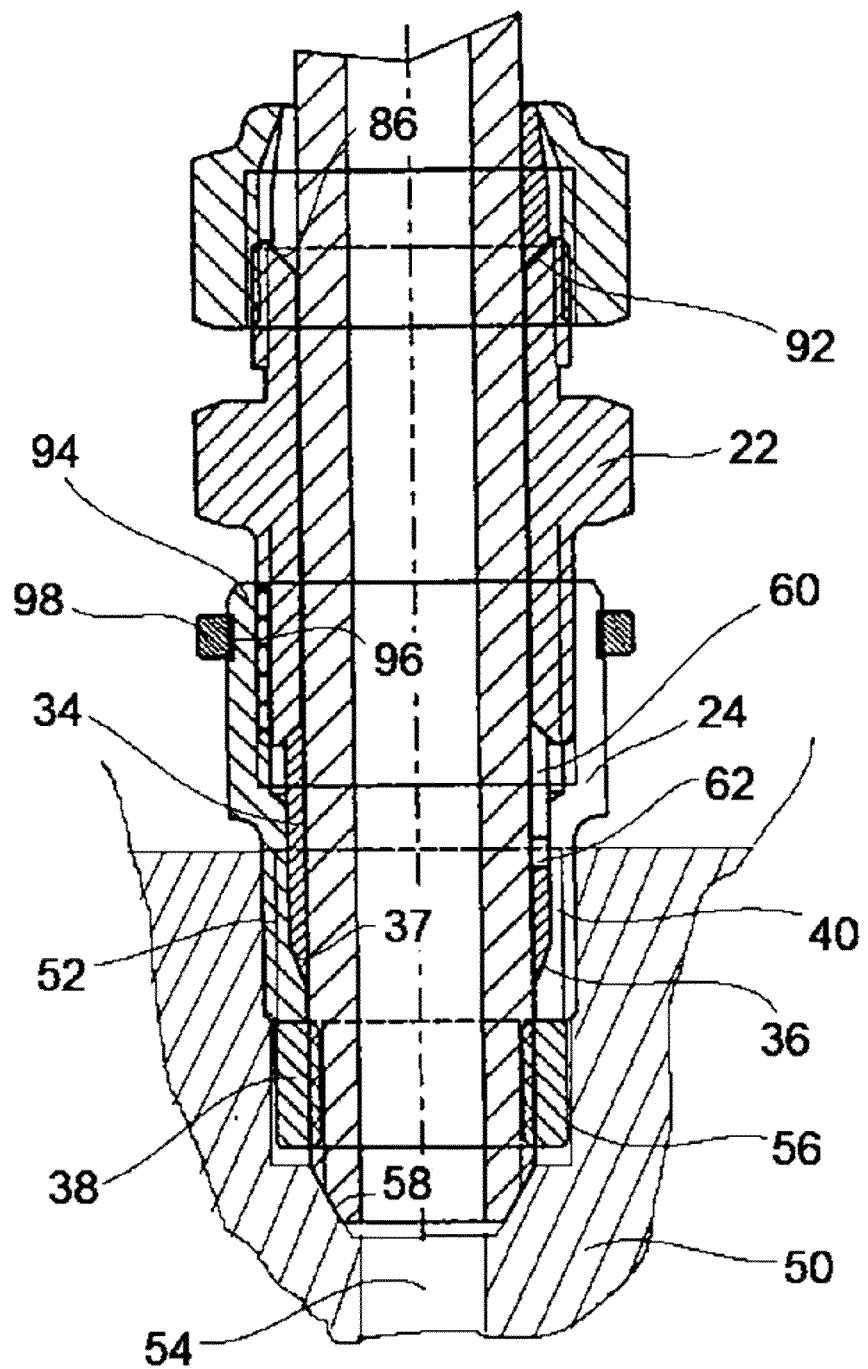
FIG. 6 shows an axial sectional view on a larger scale of the part of the device shown in FIGS. 1 and 2 with the male part thereof connected to a female part of the device.

FIG. 6 shows parts of the device shown in FIGS. 1 to 4 connected to a stainless steel female part 50 (only a portion of which is shown in FIG. 6) to complete the device. The female part 50 is provided with an internal screwthreaded portion 52 which engages the externally screwthreaded sleeve of the collet 24. The female part 50 is also formed with a bore 54 which communicates with and is in alignment with the axial through-bore 14 of the male part 12.

The female part 50 is provided with a recess 56 to accommodate the collar 38 on the male part 12. The female part 50 also has an internal slanting annular surface 58 which abuts the chamfered end 16 of the male part 12, which surface 58 is everywhere at substantially 30° to the longitudinal axis of the male part 12.

The wedge part 34 can be seen more clearly in FIG. 6. This shows that the rearward half of the wedge part 34 is split by means of a slot 60 which is open at the rearward end of the wedge part 34 and which is blind at its opposite end where it widens by virtue of its opening into a laterally extending through-hole 62. Thus the diameter of the through-hole 62 is greater than the width of the slot 60. The through-hole 62 acts as stress relieving point to reduce the likelihood of the material of the wedge part 34 fracturing at the blind end of the slot 60.

Figure 4:
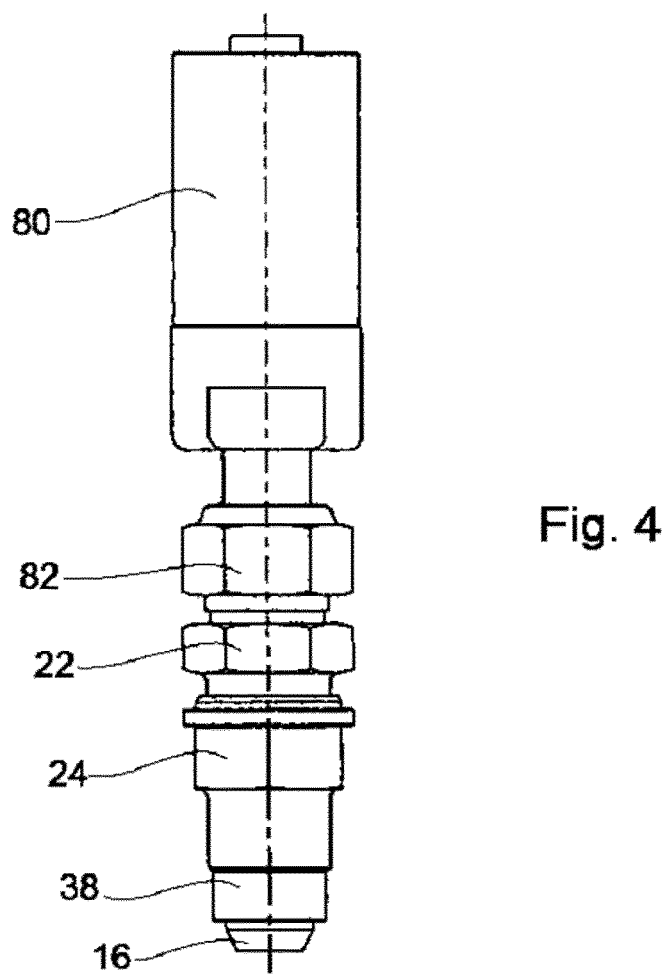
FIG. 4 shows a side view of the device shown in FIGS. 1 and 2.

All the parts of the connector device shown in FIG. 4 are made of stainless steel, but other materials may be used.

The connector device shown in FIG. 6 is assembled in the following order:

First the wedge part 34 is inserted into the collet 24. Next, the screw 22 with the anti-vibration parts 82 to 92 on its rear end has its forward end screwthreaded into the collet 24, and the assembly of the screw 22, the collet 24, and the wedge part 34 is slid on to the forward end of the male part 12. The collar 38 is then screwed onto the forward end of the male part 12.

This assembly is now screwed into the female part 50. As the collet 24 is tightened within the female part 50, the forward end of the collet 24 abuts the collar 38 at the same time as the chamfered end 16 of the male part 12 is urged against the correspondingly slanting inner surface of the female part 50. Since the slanting surface 16 tapers slightly less sharply than the surface 58, the corner between the surface 16 and the forwardmost front surface of the male part 12 is urged into the surface 58 to form a metal to metal seal between the male part 12 and the female part 50 at the smallest diameter of the surface 16, to minimise the total force exerted by fluid when the device is in use, by virtue of the pressure in that fluid, and ensure no such pressure is exerted between the surfaces 16 and 58. Because the screwthreads of the collet 24 and the female part 50 are righthanded, whereas the screwthreads of the collar 38 and the forward end of the male part 12 are left-handed, the frictional engagement between the collet 24 and the collar 38 tends to rotate the collar 38 towards the collet 24 as the collet 24 is urged towards the collar 38, so that these two parts are jammed tightly against one another. Further tightening of the collet 24 within the female part 50 thereby creates a seal between the male part 12 and the female part 50.

At this stage, the screw 22 is tightened relative to the collet 24, driving the wedge part 34 further into the collet 24 so that the wedge surfaces 36 and 37 engage one another and so that at the same time the forward half of the wedge part 34 is driven against the outer surface of the male part 12, and the forward portions of the collet 24 are splayed outwardly against the female part 50, so that all the parts are locked together against torsional and lateral forces up to satisfactory threshold values. At this stage, the closed ring or hoop 98 acts to inhibit the rear end of the collet 24 from being splayed, which if it were splayed would have an adverse effect on the splaying of the forward end of the collet 24. Also at the same time, the extension of the slot 40 all the way to the very rear of the collet 24, and indeed being open at the rear end of the collet 24, facilitates sufficient movement of the collet material under the ring or hoop 98 in turn to facilitate splaying of the forward end of the collet 24.

Finally, the nut 82 is tightened onto the screw 22. The wedge engagement between the surfaces 86 and 92 tightens the split wedge ferrule 90 onto the male part 12, whereafter the anti-vibration parts 82 to 92 act to dampen any vibration in the connector device 10 by virtue of a degree of springiness in the anti-vibration rearward end 88 of the nut 82.

All the parts of the connector device are preferably made of the same material to avoid deleterious effects from corrosive electrolytic action. Preferably they are all made of stainless steel, for example stainless 316, or Inconel® steel alloy.

Numerous variations and modifications to the illustrated connector device may occur to the reader without taking the resulting construction outside the scope of the present invention. For example, the wedge part 34 may extend beyond the rear end of the collet 24. Alternatively or in addition the slot 60 may be absent, so that there is no slot in the wedge part 34. Alternatively or in addition, the wedge part 34 may be thicker at its rear end, so that it has a flange there to improve its strength, especially for smaller embodiments. Alternatively or in addition, the rear end of the wedge 34, and the surface of the screw 22 which abuts the rear end, may be orthogonal to the axis of the connector device rather than on a slant thereto. The through-bore 14 through the male part 12 may be of uniform cross-section throughout, so that it has no increased cross-section in the portion 18, or it may have a narrowed cross-section instead of an increased cross-section.

The female part 50 shown in FIG. 6 is shown as a wall portion, but it may instead be part of a tubular portion.

The surfaces of the collet 24 and the collar 38 which abut one another may be slanted relative to the axis of the device, for example at an angle of 60° thereto.

The connector device illustrated in the Figures may be used to connect hose to a deep sea oil head, for example.

The rear parts 18 and 80 of the illustrated connector device may be replaced by a simple pipe, which may in turn be welded to another part, or the parts 18 and 80 may be replaced by a stab plate connector, for example.

The interior leading edge of the ring or hoop 98 may be chamfered to assist its placement on the collet 24 into the groove 96. Alternatively or in addition, the ring may be heated to expand it and facilitate such placement. Alternatively the ring or hoop 98 may be provided with an internal screwthread and the collet 24 may be provided with a corresponding external screwthread at its rear end instead of the groove 96, to enable the ring or hoop 98 to be screwed onto the rear end of the collet 24.

The invention claimed is:

1. A connector device (10) comprising:
a male part (12);
a female part (50) which engages the male part (12) when those two parts (12, 50) are connected together, those two parts (12, 50) having respective passageways which are coaxial when those two parts (12, 50) are connected together;
a collet (24) which surrounds the male part (12) and is coupled thereto, in which said collet (24) has an external screwthread which engages an internal screwthread (52) on the female part (50), so that relative rotation between those screwthreads in a given sense causes the female part (50) to sealingly engage the male part (12), and in which said collet (24) has at least one slot (40) in it which extends longitudinally with respect to the axis of the screwthreads to enable the collet (24) to be splayed, and in which said slot (40) is open at both ends so that the collet (24) is a split collet; and
a wedge part (34) which is located between the male part (12) and the collet (24) and is displaceable longitudinally with respect to the axis of the screwthreads to splay the collet (24) thereby to lock the male and female parts (12, 50) in such a sealing engagement with one another;
the connector device (10) further comprises a closed ring (98) which surrounds that end of the collet (24) which is further from the position at which the male and female parts (12, 50) sealingly engage one another, thereby to resist splaying of the collet (24) at that end, characterized in that
the said sealing engagement is between a chamfered rim (16) at an end of the male part (12), and a chamfered lip (58) within the female part (50).

2. A connector device (10) according to claim 1, characterised in that the angle of the chamfering on the male part (12), relative to the axis of the screwthreads, is less than the angle of the chamfering on the female part (50).

3. A connector device (10) according to claim 1, characterised in that the collet (24) is coupled to the male part (12) by way of a collar (38) around the male part (12) adjacent to the said sealing engagement, an end of the collet (24) abutting the collar (38) during relative rotation between the said screwthreads.

4. A connector device (10) according to claim 3, characterised in that the collar (38) is secured to the male part (12) by way of interengaging screwthreads on the collar (38) and on the male part (12).

5. A connector device (10) according to claim 4, characterised in that the interengaging screwthreads on the collar (38) and on the male part (12) are of opposite handedness to the said external screwthread of the collet (24) and the said internal screwthread of the female part (50).

6. A connector device (10) according to claim 3, characterised in that the surfaces of the collet (24) and the collar (38) which abut one another are on a slant, such that the collar (38) tapers in a direction towards the collet (24).

7. A connector device (10) according to claim 1, characterised in that the collet (24) is provided with a nut portion to facilitate relative rotation between the collet (24) and the female part (50).

8. A connector device (10) according to claim 1, characterised in that the connector device (10) further comprises a screw (22) having an external screwthread (23) which engages an internal screwthread of the collet (24), the screw (22) being provided with a portion which engages the wedge part (34) so that relative rotation between the screw (22) and the collet (24) causes the wedge part (34) to be driven further into the region between the collet (24) and the male part(12), to splay the collet (24).

9. A connector device (10) according to claim 1, characterised in that both the wedge part (34) and the region between the collet (24) and the male part (12) taper in a direction towards the female part (50).

10. A connector device according to claim 1, characterised in that the wedge part (34) also has at least one slot (60) in it extending longitudinally relative to the axis of the screwthreads.

11. A connector device (10) according to claim 1 characterized in that the collet has a generally cylindrical rear end (94) with an outer surface having an annular groove (96) in it which receives the said closed ring (98).

12. A connector device (10) according to claim 11 characterized in that an interior leading edge of the closed ring (98) is chamfered to assist in its placement on the collet (24) into the annular groove (96).

13. A connector device (10) according to claim 11 characterized in that the closed ring (98) has been heated to expand it and facilitate such placement into the annular groove (96).

14. A connector device (10) according to claim 1 characterized in that the closed ring (98) is provided with an internal screwthread and the collet (24) is provided with a corresponding external screwthread at its rear end to enable the closed ring (98) to be screwed onto the rear end of the collet (24).

* * * * *